United States Patent Office 3,397,995
Patented Aug. 20, 1968

3,397,995
EDIBLE DIETARY SPREAD AND METHOD
OF MAKING SAME
Gilbert D. Elenbogen, Skokie, Ill., assignor to Vitamins, Inc., Chicago, Ill., a corporation of Illinois
No Drawing. Continuation-in-part of application Ser. No. 318,078, Oct. 22, 1963. This application Feb. 16, 1966, Ser. No. 527,724
5 Claims. (Cl. 99—116)

This is a continuation-in-part application of my application bearing Ser. No. 318,078 filed Oct. 22, 1963, now abandoned.

This invention relates to a new and improved method for making edible, dietary spreads having a high ratio of polyunsaturated fats to saturated fats, and the method for making same.

Polyunsaturated fats or oils are liquid at room temperature, and therefore it is difficult to make solid products using a high percentage of such fats. For this reason, spreads resembling butter had a polyunsaturated fat to saturated fat ratio that did not exceed much above about 2:1. A still higher ratio of polyunsaturated fats is desirable for edible products for a low blood serum cholesterol level in humans.

In co-pending applications Ser. No. 397,037 filed Sept. 16, 1964, there is disclosed and claimed an imitation spread resembling cream cheese having a ratio of polyunsaturated fat to saturated fat from about 3:1 to 9:1, and having a total fat content of about 16% to 40% by weight. No trace of vegetable oil can be detected with this spread, and therefore the taste and appearance is particularly pleasing.

Manufacturing the spread, described in application Ser. No. 397,037, referred to above, requires the addition of a lactic acid producing culture, which necessitates incubation for about 15 to 18 hours until the desired pH value is reached. This results in at least one extra day for the manufacture of the spread, during which time additional personnel are required to ascertain when proper incubation is achieved.

With my present method, the imitation spread is produced more rapidly such that the preparation of the spread can be commenced and completed during one 8-hour work shift. This results in a valuable savings in the manufacture of the spread.

According to the present invention of preparing an emulsified, edible spread such as a spread resembling cream cheese, lactic acid, instead of lactic acid producing culture, is directly incorporated into the spread composition prior to solidification. This improvement obviates the need for incubation and cooling, and produces a spread having an appealing taste.

In accordance with my invention, the edible cream cheese spread contains about 15 to 40% by weight total fat or oil with a ratio of polyunsaturated to saturated fats being in the range from about 3:1 to about 9:1. Further, the spread contains, based on the ultimate weight of the spread, about 0.1 to 2% of a stabilizing vegetable gum, about 5 to 15%, preferably about 7 to 10%, of phosphoprotein solids from the group consisting of casein, alkali caseinate such as exemplified by sodium caseinate and calcium caseinate, and non-fat milk solids, and suitable admixtures thereof, about 0.3 to 2% lactic acid, and the balance water in the range of about 40 to 70%, all percentages being by weight. The spread made in accordance with the invention is substantially homogeneous at room temperature and refrigerator temperatures, and does not normally separate into phases. Moreover, the spread resembles cream cheese and is uniformly spreadable and has smooth taste and texture.

In the preparation of the spread, the stabilizing vegetable gum is thoroughly blended with the fat or oil content. The resulting blend is admixed with the phosphoprotein solids, the mixing being carried out at a temperature from about 70 to 150° F., after which it is homogenized as in a conventional dairy homogenizer, such as a Cherry-Burrell homogenizer, at a range from about 1,000 to 2,500 p.s.i. Lactic acid is added to the mixture to coagulate or solidify the mixture.

The composition is then pasteurized at a temperature of from about 165 to 175° F. for about 20 to 35 minutes. An emulsifier, such as a mono and diglyceride emulsifier or sorbitan esters of fatty acids, may be added in sufficient quantity to emulsify the fat. Also, at this stage other desirable constituents may be added such as a mold inhibitor preservative, antioxidant, vitamins, coloring agents and/or flavoring agents. After pasteurization is complete, the composition is homogenized a second time at a pressure of about 1,000 to 2,500 p.s.i., and the resulting product is then packaged.

The vegetable oil used in making the spread of this invention has not been hydrogenated by synthetic chemical means. Suitable vegetable oils include, for example, corn oil, sesame oil, cotton seed oil, safflower oil, wheat germ oil, or various combinations thereof, the particular oils being used depending upon such factors as the degree of unsaturation desired, stability and flavor desired. For example, the flavoring of the spread could be altered by substituting a small amount of butter fat for a small portion of the vegetable oil. A particularly smooth spread is achieved by employing a small amount of coconut oil in combination with corn oil or one of the other vegetable oils.

When highly unsaturated oils are used, e.g. safflower oil, it is desirable to employ an antioxidant. Suitable antioxidants include butylated hydroxyanisole, butylated hydroxytoluene or nordihydrognaiaretic acid. The amount of antioxidant employed should be sufficient to preserve the product against oxidation, but typically for nordihydrognaiaretic acid about 0.1% by weight is used.

A number of stabilizing vegetable gums may be employed in preparing the spread. These include, for example locust bean gum, gum arabic, gum tragacanth, guar gum, gelatin, or suitable mixtures thereof.

Artificial spreads commonly employ additional constituents such as vitamins, preservatives, flavoring agents and coloring agents. Any of a variety of vitamins can be employed, and for a cheese spread these can include, for example, vitamin A, vitamin D or vitamin E. Mold inhibitor preservatives include, for example, sorbic acid, sodium benzoate or sodium propionate, typically in the amounts of about 0.1% of the ultimate weight of the product. Suitable coloring agents include, for example, an attotumeric blend or carotene.

The spread produced in accordance with the invention is an emulsified edible cream spread resembling cream cheese that is uniformly spreadable, has a smooth texture and is substantially homogenous at room and refrigerator temperatures. Moreover, the spread does not separate into phases, and has been found not to separate when permitted to stand for 30 days at about 40° F. The spread contains a trace only of cholesterol and has a ratio of polyunsaturated to saturated fats from about 3:1 to 9:1.

The invention is further illustrated in the following example where a 500 gram spread was prepared by first blending 2.5 grams of locust bean gum with 175 grams of corn oil. 30 grams of sodium caseinate and 40 grams of skim milk powder were then added, and the mixture brought to a smooth consistency by the addition of 225 grams of skim milk and 30 grams of butter milk. The admixture was then homogenized in a conventional dairy homogenizer at about 2,500 p.s.i. Thereafter, 2.5 grams of lactic acid was added to solidify the cream spread. The resulting composition, which is a semisolid at room temperature was pasteurized at 170° F. for 30 minutes. During pasteurization, vitamins A and D and atto-tumeric, as a coloring agent, were added. The composition was then again homogenized in a dairy homogenizer at a pressure of about 2,500 p.s.i. The resulting product was characterized by smooth texture, was uniformly spreadable and did not separate for 30 days at about 40° F.

The foregoing detailed description has been given for clearness of understanding only, and no unnecessary limitations should be understood therefrom, as modifications will be obvious to those skilled in the art.

What is claimed is:

1. The method of producing an emulsified edible spread resembling cream cheese characterized by having a smooth texture, being substantially homogenous at room and refrigerator temperatures, and uniformly spreadable, and having a ratio of polyunsaturated to saturated fats of about 3:1 to 9:1, said method including homogenously admixing about 15 to 40% by weight of fat, about 0.1 to 2% of a stabilizing vegetable gum, about 5 to 13% by weight of phosphoprotein solids, then adding about .2 to 3% by weight lactic acid, the balance being water, and then recovering therefrom a solidified spread product.

2. A method according to claim 1 wherein said phosphoprotein solids are selected from the group consisting of casein, alkali caseinate and non-fat milk solids, and admixtures thereof.

3. A method according to claim 1 including the additional step of homogenizing the admixture of said fat, stabilizing vegetable gum and said phosphoprotein at a pressure of about 1,000 to 2,500 p.s.i., before adding said lactic acid.

4. A method according to claim 3 including the additional step of homogenizing the final admixture at a pressure of about 1,000 to 2,500 p.s.i.

5. An emulsified edible spread resembling cream cheese characterized by a smooth texture, being substantially homogeneous at room and refrigerator temperatures, not separable into phases and uniformly spreadable, having a vegetable oil content with a ratio of polyunsaturated fats to saturated fats of about 3:1 to 9:1, the ultimate weight of said spread containing about 15 to 40% total fat by weight, about 0.1 to 2% by weight of stabilizing vegetable gum, about 5 to 13% by weight of phosphoprotein solids from the group consisting of casein, alkali caseinate and non-fat milk solids, and admixtures thereof, about 0.2 to 3% by weight of lactic acid, and substantially 40 to 70% by weight water.

References Cited

UNITED STATES PATENTS

| | | | |
|---|---|---|---|
| 1,403,405 | 1/1922 | Habbema | 99—63 |
| 2,224,720 | 12/1940 | Butterworth et al. | 99—116 |
| 2,604,405 | 7/1952 | Petersen | 99—116 |
| 3,003,882 | 10/1961 | Peat | 99—123 X |

FOREIGN PATENTS 852,908  11/1960  Great Britain.

A. LOUIS MONACELL, *Primary Examiner.*

J. M. HUNTER, *Assistant Examiner.*